US010754323B2

(12) United States Patent
Freer et al.

(10) Patent No.: US 10,754,323 B2
(45) Date of Patent: Aug. 25, 2020

(54) METHODS AND SYSTEMS FOR IMPLEMENTING DISTRIBUTED LEDGER MANUFACTURING HISTORY

(71) Applicant: General Electric Company, Schenectady, NY (US)

(72) Inventors: John Joseph Freer, Saratoga Springs, NY (US); Richard Paul Messmer, Rexford, NY (US); Arvind Rangarajan, Niskayuna, NY (US); David Robert Safford, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 120 days.

(21) Appl. No.: 15/847,142

(22) Filed: Dec. 19, 2017

(65) Prior Publication Data

US 2018/0173203 A1 Jun. 21, 2018

Related U.S. Application Data

(60) Provisional application No. 62/436,675, filed on Dec. 20, 2016.

(51) Int. Cl.
*G05B 19/4099* (2006.01)
*G06F 21/44* (2013.01)
(Continued)

(52) U.S. Cl.
CPC ........ *G05B 19/4099* (2013.01); *B29C 64/386* (2017.08); *B29C 64/393* (2017.08);
(Continued)

(58) Field of Classification Search
CPC ..... B29C 64/386; B29C 64/393; B33Y 50/00; B33Y 50/02; G05B 19/4099;
(Continued)

(56) References Cited

U.S. PATENT DOCUMENTS 9,073,259 B2   7/2015   Dufort et al.
9,159,106 B1   10/2015  Bodell et al.
(Continued)

FOREIGN PATENT DOCUMENTS

WO   2013/086309 A1   6/2013
WO   2015/116341 A1   8/2015
(Continued)

OTHER PUBLICATIONS

International Search Report and Written Opinion issued in connection with corresponding WO Application No. PCT/US2017/067618 dated Apr. 26, 2018.
(Continued)

*Primary Examiner* — Chad G Erdman
(74) *Attorney, Agent, or Firm* — Dority & Manning, P.A.

(57) ABSTRACT

Some aspects are directed to additive manufacturing systems. An example additive manufacturing system controller is configured to receive a build file comprising instructions for controlling the manufacturing hardware to generate the object, receive a material identifier indicating a particular lot of manufacturing media, validate the build file and the material identifier via a distributed ledger to verify at least one of an author of the build file or an origin of the particular lot of manufacturing media, control the manufacturing hardware using the build file to generate the object using the particular lot of manufacturing media, and in response to completion of the generation of the object, generate an object manufactured transaction to the distributed ledger indicating a result of the validation of the origin of the at least one of the build file or the material identifier.

18 Claims, 5 Drawing Sheets

(51) Int. Cl.
*B29C 64/386* (2017.01)
*B33Y 50/00* (2015.01)
*B33Y 50/02* (2015.01)
*G06F 21/62* (2013.01)
*B29C 64/393* (2017.01)
*H04L 9/32* (2006.01)

(52) U.S. Cl.
CPC ............... *B33Y 50/00* (2014.12); *B33Y 50/02* (2014.12); *G06F 21/44* (2013.01); *G06F 21/62* (2013.01); *H04L 9/3239* (2013.01); *H04L 9/3247* (2013.01); *G05B 2219/49007* (2013.01); *H04L 2209/38* (2013.01)

(58) Field of Classification Search
CPC ........... G05B 2219/49007; G06F 21/44; G06F 21/62; H04L 2209/38; H04L 9/3239; H04L 9/3247
See application file for complete search history.

(56) References Cited

U.S. PATENT DOCUMENTS

| | | | |
|---|---|---|---|
| 9,331,856 B1* | 5/2016 | Song | H04L 9/3247 |
| 10,007,826 B2* | 6/2018 | Ebrahimi | G09C 5/00 |
| 2007/0183633 A1* | 8/2007 | Hoffmann | G06K 9/00221 |
| | | | 382/116 |
| 2010/0031351 A1 | 2/2010 | Jung et al. | |
| 2014/0156053 A1 | 6/2014 | Mahdavi et al. | |
| 2014/0223583 A1 | 8/2014 | Wegner et al. | |
| 2014/0271221 A1 | 9/2014 | Soucy et al. | |
| 2015/0061195 A1* | 3/2015 | DeFelice | B29C 64/386 |
| | | | 264/497 |
| 2015/0134955 A1 | 5/2015 | Lacaze et al. | |
| 2015/0362898 A1 | 12/2015 | Potter | |
| 2016/0067927 A1 | 3/2016 | Voris et al. | |
| 2016/0098723 A1* | 4/2016 | Feeney | G06Q 20/4016 |
| | | | 705/75 |
| 2017/0279783 A1* | 9/2017 | Milazzo | H04L 63/061 |

FOREIGN PATENT DOCUMENTS

| | | |
|---|---|---|
| WO | 2015166048 A1 | 11/2015 |
| WO | 2016053697 A1 | 4/2016 |
| WO | 2016097911 A1 | 6/2016 |
| WO | 2016113214 A1 | 7/2016 |

OTHER PUBLICATIONS

Michael A. Kolitsky, "3D Printed Tactile Learning Objects: Proof of Concept", Blindness Innovation and Research, vol. 4, Issue: 1, 2014.

* cited by examiner

METHODS AND SYSTEMS FOR IMPLEMENTING DISTRIBUTED LEDGER MANUFACTURING HISTORY

BACKGROUND

The term "additive manufacturing" refers to processes used to synthesize three dimensional objects using digital models or other electronic data sources. So-called "3d printers" are capable of receiving a series of instructions corresponding to a particular object and controlling the hardware utilizing a manufacturing medium (e.g., metallic alloys, resins, rubbers, clays, photopolymers, ceramic matrices, and the like) to construct that particular object. Advances in this technology have increased the ability to perform these manufacturing processes faster and more accurately than ever before.

However, the ability to reconstruct an object from a digital representation using arbitrary manufacturing equipment and material introduces certain technical challenges related to the verification and validation of constructed objects. Current systems for additive manufacturing lack verification and validation systems for ensuring that objects produced by the process are appropriately certified. If, for example, a replacement part for an industrial asset is possible to produce via an additive manufacturing process, any user with access to an appropriately configured additive manufacturing device can reproduce the part. End users who purchase or otherwise receive such a part of no way of verifying that a replacement part manufactured in this way was produced using a correct build file, using correct manufacturing media, and on a properly configured additive manufacturing device. A fault, failure, or non-standard condition at any step of the additive manufacturing process or with any material component of the produced part may result in a catastrophic failure of that part when installed in the industrial asset.

It would therefore be desirable to provide systems and methods for implementing a historical data record of an additive manufacturing process with verification and validation capabilities that may be integrated into additive manufacturing devices.

SUMMARY

Some embodiments generally relate to methods and systems for implementing a distributed ledger-based manufacturing history of an additive manufacturing process. Embodiments include additive manufacturing devices that include hardware configured to enable distributed ledger access and authentication of various inputs and outputs of an additive manufacturing process. Embodiments further include systems and methods supporting the verification and validation of output objects, including systems and methods with the capability of identifying a particular output object as "certified" in response to determining that the distributed ledger history associated with the object meets certain criteria.

An embodiment provides an additive manufacturing system configured to implement a distributed ledger system. The additive manufacturing device includes manufacturing hardware configured to generate an object via an additive manufacturing process, and a controller. The controller is configured to receive a build file comprising instructions for controlling the manufacturing hardware to generate the object, receive a material identifier indicating a particular lot of manufacturing media, validate the build file and the material identifier via a distributed ledger to verify at least one of an author of the build file or an origin of the particular lot of manufacturing media, control the manufacturing hardware using the build file to generate the object using the particular lot of manufacturing media, and in response to completion of the generation of the object, generate an object manufactured transaction to the distributed ledger indicating a result of the validation of the origin of the at least one of the build file or the material identifier.

The distributed ledger may be a blockchain ledger. The build file may include an identifier electronically signed by an author of the build file, and validating the build file may include accessing the distributed ledger to verify an authoring transaction between the author of the build file and the distributed ledger during creation of the build file. Verifying the authoring transaction between the author of the build file and the distributed ledger may include determining that the transaction is digitally signed by the author. The material identifier may include an identifier electronically signed by a manufacturer of the particular lot of manufacturing media, and validating the origin of the particular lot of manufacturing media may include accessing the distributed ledger to verify a material manufacturing transaction between the manufacturer of the particular lot of manufacturing media and the distributed ledger at completion of manufacturing of the particular lot of manufacturing media. The controller may be further configured to certify the object in response to verifying both the author of the build file and the origin of the particular lot of manufacturing media, and the object manufactured transaction may indicate that the object is certified. The object manufactured transaction may be electronically signed by a private key associated with the additive manufacturing device. Validating the build file and the material identifier via the distributed ledger may include determining whether data indicating a contract between the author of the build file and the origin of the particular lot of manufacturing media exists within the distributed ledger.

Embodiments also include a method for implementing a distributed ledger system in a digital manufacturing process. The method includes receiving a build file comprising instructions for controlling the manufacturing hardware to generate the object, receiving a material identifier indicating a particular lot of manufacturing media, validating the build file and the material identifier via a distributed ledger to verify at least one of an author of the build file or an origin of the particular lot of manufacturing media, cause manufacturing hardware to generate the object using the build file and the particular lot of manufacturing media, and, in response to completion of the generation of the object, generating an object manufactured transaction to the distributed ledger indicating a result of the validation of the origin of the at least one of the build file or the material identifier.

The distributed ledger may be a blockchain ledger. The build file may include an identifier electronically signed by an author of the build file, and validating the build file may include accessing the distributed ledger to verify an authoring transaction between the author of the build file and the distributed ledger during creation of the build file. Verifying the authoring transaction between the author of the build file and the distributed ledger includes determining that the transaction is digitally signed by the author.

The material identifier may include an identifier electronically signed by a manufacturer of the particular lot of manufacturing media, and validating the origin of the particular lot of manufacturing media may include accessing the distributed ledger to verify a material manufacturing transaction between the manufacturer of the particular lot of manufacturing media and the distributed ledger at completion of manufacturing of the particular lot of manufacturing media. The method may include certifying the object in response to verifying both the author of the build file and the origin of the particular lot of manufacturing media, and wherein the object manufactured transaction indicates that the object is certified. The object manufactured transaction may be electronically signed by a private key associated with the additive manufacturing device. Validating the build file and the material identifier via the distributed ledger may include determining whether data indicating a contract between the author of the build file and the origin of the particular lot of manufacturing media exists within the distributed ledger.

Another embodiment includes a non-transitory computer readable storage medium comprising instructions that, when executed by a processor, cause the processor to receive a build file comprising instructions for controlling the manufacturing hardware to generate the object, receive a material identifier indicating a particular lot of manufacturing media, validate the build file and the material identifier via a distributed ledger to verify at least one of an author of the build file or an origin of the particular lot of manufacturing media, cause manufacturing hardware to generate the object using the build file and the particular lot of manufacturing media, and in response to completion of the generation of the object, generate an object manufactured transaction to the distributed ledger indicating a result of the validation of the origin of the at least one of the build file or the material identifier.

The distributed ledger may be a blockchain ledger. The build file may include an identifier electronically signed by an author of the build file, and validating the build file may include accessing the distributed ledger to verify an authoring transaction between the author of the build file and the distributed ledger during creation of the build file. Verifying the authoring transaction between the author of the build file and the distributed ledger may include determining that the transaction is digitally signed by the author.

DETAILED DESCRIPTION

Overview and Definitions

Figure 1:
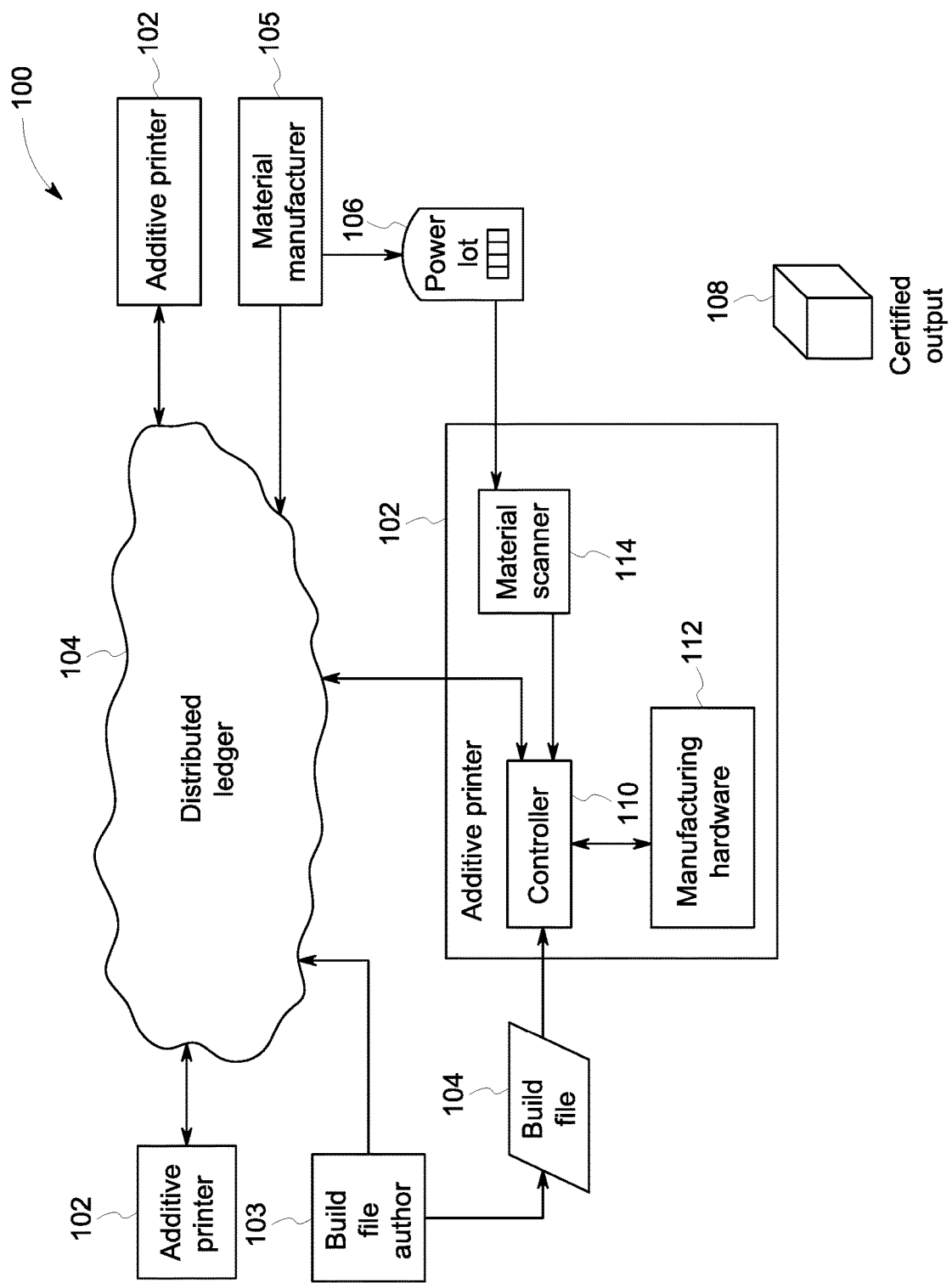
FIG. 1 depicts a system diagram of an additive manufacturing system in communication with a distributed ledger in accordance with some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

The inventors have recognized that the problems of verification and validation of objects printed using additive manufacturing devices pose significant obstacles to the democratization and uptake of the technology. To this end, the inventors have implemented electronic processes that generate a cryptographically protected electronic records that may be used to verify, validate, and certify objects produced using additive manufacturing techniques. Furthermore, these electronic records allow for a flexible, straightforward mechanism for analyzing object histories that provide improved techniques for identifying the cause of faults and errors.

To this end, the inventors have developed improved additive manufacturing devices and techniques that enable interaction with a distributed ledger database to record interactions between an object and various devices, materials, and processes through an additive manufacturing process. As a specific example, embodiments may interact with a blockchain ledger to record elements of the manufacturing process in a format that ensures each transaction is properly signed and/or validated, and that signed/validated transactions are not able to be retroactively altered. Embodiments may include both additive devices configured to utilize such a distributed database and other devices that enable interaction with the same distributed database by other components of the additive manufacturing process. For example, a manufacturer of additive manufacturing media may transact with the distributed database when producing the manufacturing media, such that each lot of media is associated with a particular transaction signed by the manufacturer. Similarly, a build file authoring system or author may transact with the distributed database when authoring a new build file to create a record that may be employed to later validate the build file.

It should be appreciated that embodiments of the distributed ledger database may be implemented according to various protocols and systems capable of providing the functionality described herein. An example embodiment utilizes the blockchain protocol, but it should be appreciated that various other similar frameworks, protocols, and/or mechanisms for providing distributed ledger database techniques that are capable of supporting transaction validation and authentication using a distributed ledger may also be employed.

As used herein, the term "distributed ledger" should be understood to refer to a type of database that is spread across multiple parties. Records stored in such a distributed ledger may be stored in a continuous ledger or organized into blocks, as in the case of the "blockchain protocol." In the present context, embodiments may be implemented according to various configurations of the distributed ledger. For example, embodiments may employ permissioned or unpermissioned ledgers, and such ledgers may be public or private depending upon the desired participants. As a particular example, embodiments may implement multiple redundant copies of a database on disparate computing nodes, with a shared ledger of hashed transactions made to those databases. The shared ledger may be employed to enable individual copies of the database to verify the transactions written to each database.

As used herein, the term "blockchain" refers to a type of distributed ledger database that encodes records into "blocks" of a number of records. Blocks are chained together by including references in blocks to preceding and/or subsequent blocks.

As used herein, the terms "additive manufacturing device", and "additive printer" should be understood to refer to any manufacturing device that serves to produce a three dimensional output object from a digital file using techniques that may include, but are not limited to, fused deposition modeling, fused filament fabrication, direct ink writing, stereolithography, digital light processing of photopolymers, powder bed head 3d printing, electron beam melting, selective laser melting, selective heat sintering, selective laser sintering, direct metal laser sintering, laminated object manufacturing, directed energy deposition, or electron beam freeform fabrication.

Overview of System Implementing Distributed Ledger-Enabled Additive Manufacturing Device FIG. 1 is a high-level architecture of a system 100 for implementing a distributed ledger-enabled additive manufacturing device in accordance with some embodiments. The system 100 provides for improved functionality of an additive printer 102 by enabling verification and validation functionality for the manufacturing process and various components thereof. The system 100 advantageously provides an integrated system that utilizes a blockchain or other distributed database ledger to enable validation across various elements of an additive manufacturing process. The system 100 particularly describes a distributed ledger 104 in communication with one or more additive printers 102, build file authoring systems 103 and material manufacturers 105, though it should be appreciated that various other users or stakeholders of an additive manufacturing process (e.g., a customer purchasing a produced object) may also access the distributed ledger 104 in some embodiments, such as to verify the origin or manufacturing process used to manufacture a particular object.

The additive printer 102 may be any additive manufacturing device as known in the art. The additive printer 102 receives a build file 104 which contains instructions for manufacturing an output object 108. The build file 104 may be provided in any suitable format for instructing the additive printer 102 to construct the object, including but not limited to the .OBJ, .STL, .VRML, .X3G, file extensions, or the like. The build file 104 may be created by the build file author 103. It should be understood that while some exemplary embodiments are generally described herein with respect to additive manufacturing devices, various embodiments may also be implemented for other digital manufacturing processes that are not necessarily "additive". For example, embodiments may also be employed with investment casting processes, etching processes, and the like.

At the time the build file 104 is created, the build file author 103 may generate an authoring transaction to the distributed ledger 104 using a private key assigned to the build file author 103. The build file author 103 may also encode the build file 104 with a public key corresponding to the private key, enabling authentication of the build file 104 by the additive printer 102 via the distributed ledger 104.

Similarly, the material manufacturer 105 may generate a material manufacturing transaction via the distributed ledger 104 upon manufacturing of a lot of material, such as a powder lot 106. The material manufacturer 105 may sign the material manufacturing transaction with the distributed ledger 104 using a private key associated with the material manufacturer 105, and indicate a serial number or public key on the powder lot 106 itself (e.g., on the packaging, such as a barcode or Quick Recognition (QR) code). Upon initiating a manufacturing action using the powder lot 106, the additive printer 102 may scan the powder lot 106 and identify the serial number or public key. The additive printer 102 may use the identified serial number or public key to determine the origin of the manufactured powder by verifying the material manufacturing transaction with the distributed ledger 104 initiated by the material manufacturer 105 at the time the powder lot 106 was manufactured.

To enable validation of a build process by the additive printer 102, the build file author 103 and the material manufacturer 105 may interface with the distributed ledger 104 to store a data structure representing a particular agreement or contract between the build file author 103 and the material manufacturer 105. This contract may include, for example an indication of a build file hash provided by the build file author 103, and a material lot provided by the material manufacturer 105. An example of an architecture leveraging such techniques is described further below with respect to FIG. 3.

The additive printer 102 includes a controller 110, a material scanner 114, and manufacturing hardware 112. The controller 110 includes hardware configured by firmware and/or software to manage and control the operations of the additive printer 102. These operations include, but are not necessarily limited to, controlling the manufacturing hardware 112 to initiate a manufacturing process of an object, communicating with the distributed ledger 104 to verify received materials and other inputs, initiating one or more object manufactured transactions to record the results of an additive manufacturing process. Although various exemplary embodiments describe the controller 110 as a component of the additive printer 102, it should also be appreciated that in some embodiments certain functionality of the controller 110 may be implemented by computing hardware separate from, but in communication with, the additive printer 102. For example, the validation and distributed ledger-interface functionality may be implemented by a computing device that acts as an intermediary between the additive printer 102 and the blockchain ledger 104. A detailed example of an embodiment of a controller 110 is described further below with respect to FIG. 2.

The manufacturing hardware 112 includes various components required to implement an additive manufacturing process. As noted above, the manufacturing hardware 112 is configured and/or operated by instructions received by the controller 110. The manufacturing hardware 112 may include, for example, lasers, light emitting diodes (LEDs), actuators, positioning sensors, temperature sensors, powder deposition tools, wire feed systems, material reservoirs, and the like.

The material scanner 114 includes hardware configured to scan a lot of input material to determine an identifier associated with that material. The identifier may include, for example, a value signed by a public key of the material manufacturer 105, as described above. The identifier may be obtained by the scanner, for example, by scanning a barcode or QR code printed on material packaging, embedded within a Near Field Communication (NFC) or Radio Frequency Identifier (RFID) included within or disposed on the material packaging, or the like.

When programmed by the build file 104, the controller 110 may configure the manufacturing hardware 112 to manufacture the powder lot 106 (or other material) to create an output object 108. During the manufacturing process, the additive printer 102 may communicate with the distributed ledger 104 to determine whether the creation process of the output object 108 meets certain criteria to label the output object 108 as a "certified" output object. For example, labeling the output object 108 as a certified output object may occur in response to determining that the build file 104 is verified as being received from an authorized build file author, and the powder lot 106 was manufactured by an authorized material manufacturer. An example of a system architecture for performing this validation is described further below with respect to FIG. 3, and an example of a process for utilizing a distributed ledger to perform certification of the output object is described further below with respect to FIG. 4.

The output object 108 may include an identifier to associate the object 108 with the particular distributed ledger transaction or transactions that occurred during the manufacturing process. For example, an object serial number may be printed upon or embedded within the object (e.g., as part of the manufacturing process) that may be used to as a key to perform a lookup within the distributed ledger for the particular transactions (e.g., powder lot identification, build file identification, additive manufacturing device identification) that resulted in production of the output object 108.

Example of Additive Manufacturing Device Controller

Figure 2:
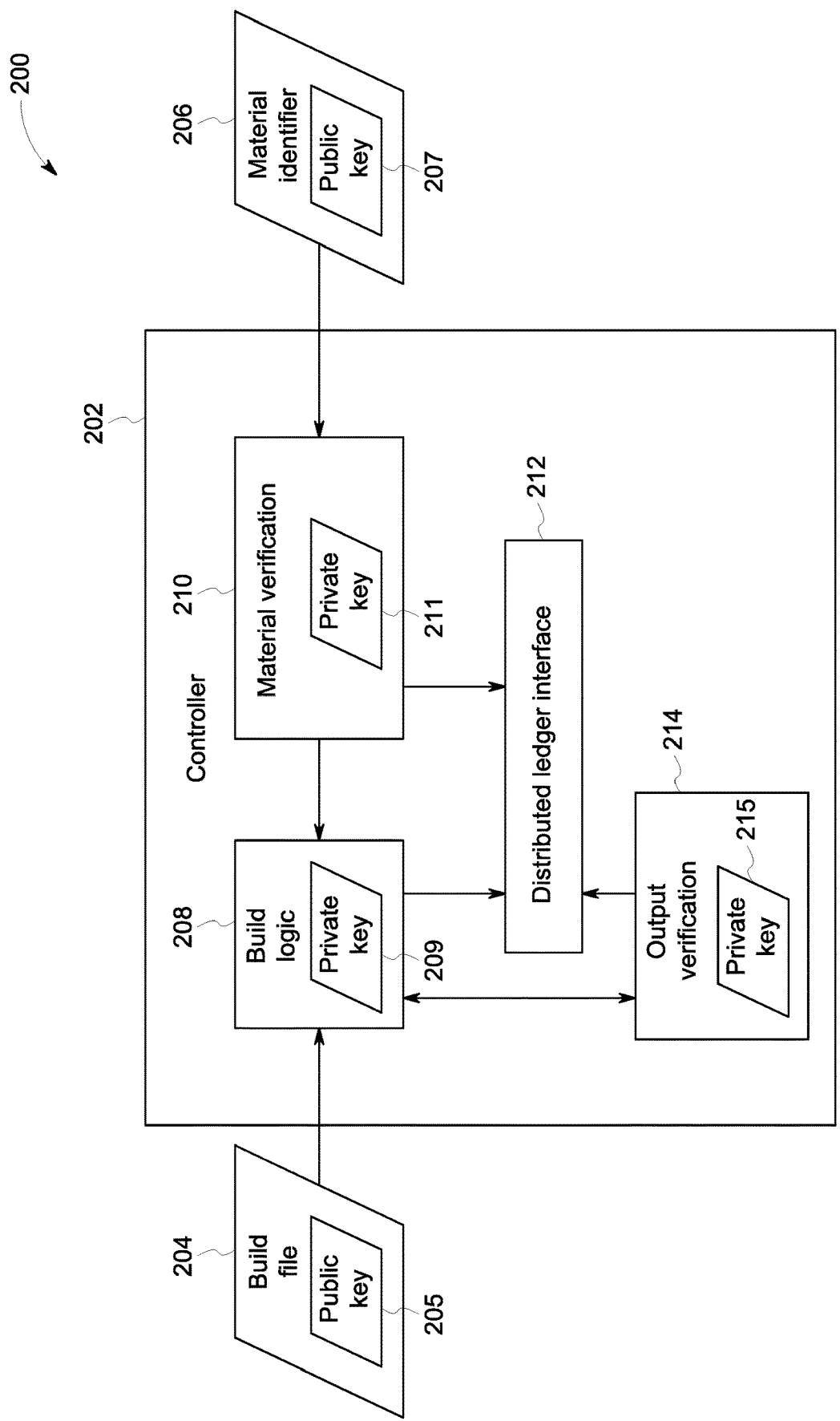
FIG. 2 depicts a detailed logical data flow diagram of an additive manufacturing system controller in accordance with some embodiments.

FIG. 2 illustrates a detailed example of a logical data interactions 200 involving a controller 202 of an additive manufacturing device. The controller 202 may be, for example, an example of a controller 110 as described above with respect to FIG. 1. The controller 202 may include computing hardware programmed by software and/or firmware to perform the functions illustrated in FIG. 2. An example of hardware for implementing such a controller is described further below with respect to FIG. 4.

The controller 202 includes build logic 208 for performing a manufacturing process. The build logic 208 receives a build file 204 which includes instructions for manufacturing an object. The build file 204 may include a build file identifier 205 signed by the author of the build file that enables verification with a distributed ledger. The build logic 208 receives this file and uses the build file identifier 205 to access a distributed ledger interface 212 to verify the origin of the build file with a blockchain ledger. This validation may occur according to known cryptographic techniques implemented within the distributed ledger, such as where the build file identifier 205 is signed by a private key of the build file author, and the controller 202 verifies the origin of the build file identifier using a public key of the build file author.

The build logic 208 is also configured to initiate an object manufactured transaction via the distributed ledger interface 212 upon completion of the additive manufacturing process to generate a record in the distributed ledger. To this end, the build logic 208 may transact with the distributed ledger to store an identifier for the output object (e.g., a serial number) along with the material identifier 202 of the material and the build file identifier 205 of the build file used to build the object. This object manufactured transaction may be signed by a private key 209 of the build logic for use in future validation operations. In some embodiments, the build logic 208 may be further configured to determine whether each of the component parts of the process meet with certain criteria to label the output object as a "certified" object. For example, if the build file author is verified as coming from an authorized source and the manufacturing material from an authorized material manufacturer, the build logic may indicate in the transaction record that the object is certified for use in validation by other parties.

The controller 202 also includes material verification logic 210. The material verification logic 210 receives a material identifier 206 associated with a lot of manufacturing material being processed by the additive manufacturing device controlled by the controller 202. As noted above with respect to FIG. 1, the material identifier 206 may be scanned or otherwise read from packaging containing the material. The material identifier 206 may include a material identifier value 207 signed by the manufacturer of the material in the same or a similar manner as the build file identifier 205. Upon receiving the material identifier 206, the material verification logic 210 may utilize the distributed ledger interface 212 to verify the origin of the material via the distributed ledger.

The build logic 208 communicates with output verification logic 214 to verify and validate the object produced by an additive manufacturing process. The output verification logic 214 includes logic configured to determine that a build process has been completed. The output verification logic 214 may for example, interface with one or more sensors of the additive manufacturing device to ensure that certain tolerances were met during the manufacturing process (e.g., temperature ranges, amount of manufacturing material used). Upon verification of the manufacturing process, the output verification logic 214 may use the distributed ledger interface 212 to transact with the distributed ledger to indicate that the build process for the object was completed successfully.

Each of the build logic 208, material verification logic 210, and output verification logic 214 may be associated with a respective private key 209, 211, 215. The private keys 209, 211, 215 enable each portion of the additive manufacturing process to be registered in the distributed ledger by the respective component of the additive printer. This process may be performed by each component individually, or the build logic 208 may initiate a transaction on behalf of various elements of the additive manufacturing device. While the instant embodiment is described with respect to verification of the build file, manufacturing material, and build process, various other aspects of the process may be validated and/or stored in the distributed ledger. For example, transactions related to shipping the output object to a purchaser, updating a software or firmware version of the controller 202, or installing the output as a replacement part in an industrial asset may also be written to the distributed ledger as transactions for recordkeeping and validation.

Figure 3:
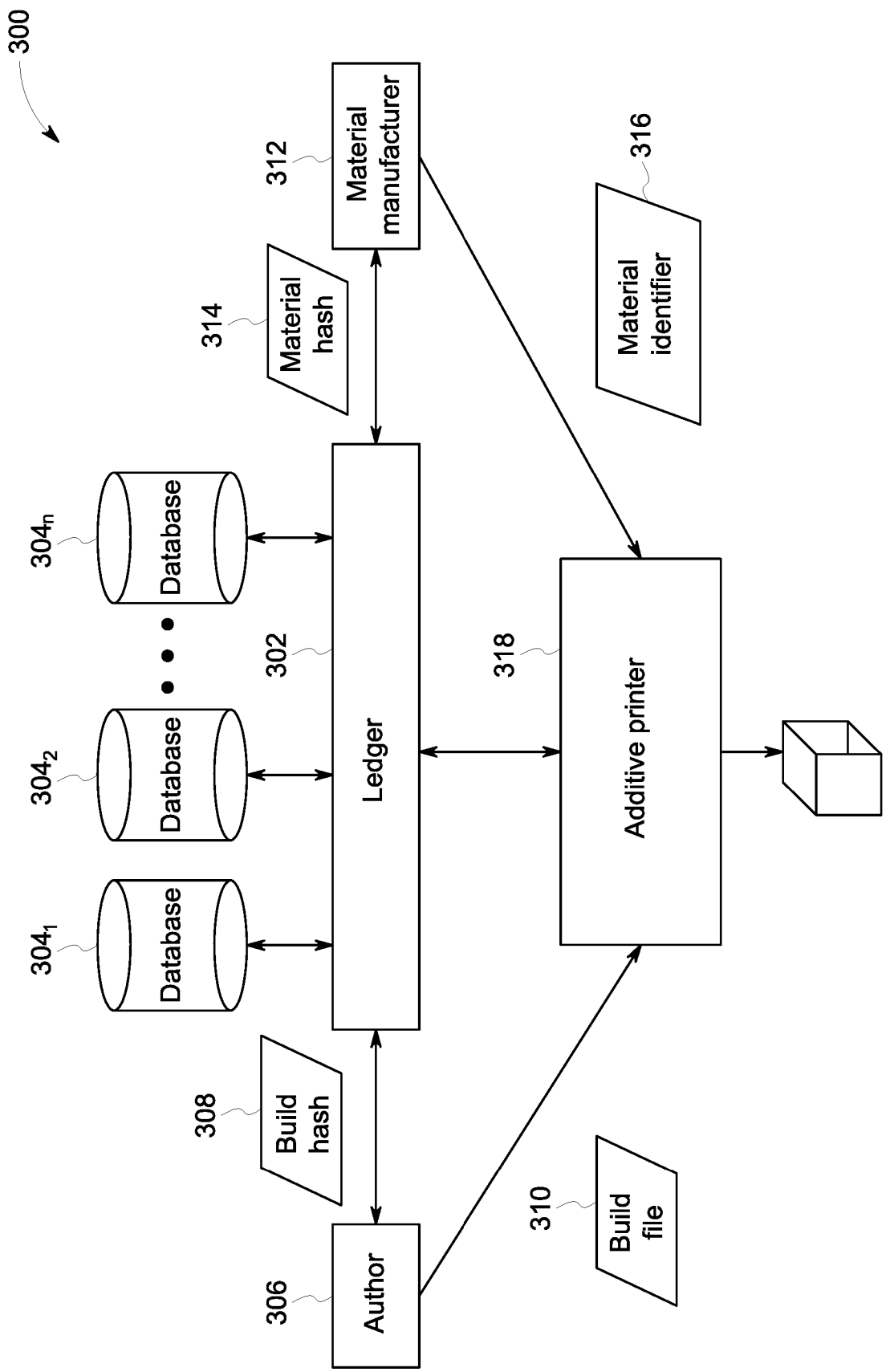
FIG. 3 depicts an architecture diagram of an additive manufacturing system with distributed ledger integration in accordance with some embodiments.

Example Architecture for Implementing Distributed Ledger for Use in Additive Manufacturing Process FIG. 3 illustrates an example of an architecture 300 for implementing a distributed ledger-enabled additive manufacturing process in accordance with some embodiments. The architecture 300 illustrates communication among a ledger 302, a series of distributed databases $304_1$-$304_n$, and parties to an additive manufacturing process 306, 312, 318.

Communication among the ledger 302 and the distributed databases 304 may be implemented according to various distributed database protocols. For example, embodiments may employ the blockchain protocol as described above. According to various embodiments, each of the databases 304 may maintain a separate copy of transaction records performed by parties to the distributed database architecture. As transactions are performed against the data stored in these databases 304, the databases 304 may generate hashes that are published to the ledger 302. Validation of these transactions and updating, verifying, and reconciling the various transactions performed with each copy of the database 304 may be performed according to various distributed database techniques, such as blockchain.

To enable validation of manufacturing processes by, for example, an additive printer 318, various parties to the transaction may implement contracts with other parties to the process that are published to the ledger 302 and the underlying databases 304. For example, an embodiment of a ledger defines one or more contract data structures that enable parties to indicate their participation in particular parts of the manufacturing process. For example, the ledger 302 may be configured to accept transactions that indicate a source for a build file, a source for a lot of manufacturing media, and an authorized build quantity of the build file.

To enable these transactions, the ledger 302 may implement application programming interfaces (APIs) and the like that enable parties to establish relationships with one another that are published to the distributed database. For example, a given contract between a build file author and a material manufacturer may include a data structure with a build file hash value 308 provided by the build file author 306, and a material hash value 314 provided by a material manufacturer 312. These hash values 308, 314 may be derived, for example, from the build file itself (e.g., a hash of the digital file) and from a characteristic of a lot of manufacturing media (e.g., from a serial number of the lot of media). A record of the contract may be created within the ledger 302, and the hash values and their relationship stored within the databases 304.

In some embodiments, the values used to form the contract for storage in the database 304 may be specific to the particular build file and lot of manufacturing media. Alternatively, in some embodiments various other levels of abstraction may be employed. For example, a contract may exist that identifies a particular manufacturer, rather than a lot of manufacturing media. Similarly, a contract may exist that identifies a particular build file author, rather than the exact file to be used. As another example, some contracts may include various logical operations to allow for completion by multiple parties. For example, a contract may be signed by a particular build file author for a particular build file and any one of multiple suppliers of a manufacturing media such that the build file can be used with manufacturing media provided by any one of the suppliers.

The ledger 302 and databases 304 may also store transaction records with an additive printer 318 for use in facilitating the validation of an output object. To initiate a build operation, the additive printer 318 receives a copy of the build file 310 from the author 310, the same build file used to generate the build hash 308. The additive printer 318 also receives a material identifier 316 (e.g., a package serial number) associated with the lot of manufacturing media to be used in the build process. To validate the manufacturing process, the additive printer 318 may perform a hashing operation on the build file 310 and the material identifier 316 and send the derived hash values to the ledger 302 as a query for validation. If a corresponding transaction exists within the database 304, then the query may be satisfied and the additive printer 318 may proceed with the build.

Once the build of the object 320 is complete, embodiments may assign a serial number to the object 320 and create another transaction via the ledger 302. This transaction may, for example, include a reference to the contract that was verified as a precursor to building the object, along with a hash value associated with the object 320 and/or the particular additive printer 318. As such, the process of creating a record of an object 320 within the ledger 302 may be completed as a set of two or more contracts, with a first contract used to verify the various components of the build process, and a second contract that references the completed first contract and includes a reference to the completed object 320.

It should be appreciated that while the contracts described here generally relate to validation of a build file and manufacturing media for use on a single additive device, alternative embodiments may include additional or different parties and validation processes. For example, a first contract may be employed between the parties as descried above (e.g., build file author and material supplier), and a second contract may be employed referencing the first contract and multiple steps of a build process. In such a case, each step of the build process may perform a separate validation with the ledger 302 such that the contract to build the object 320 is completed only once each of the plurality of steps of the build process occur.

Once the transaction is written to the ledger 302 for the manufacturing of the object 320, that transaction is propagated to the databases 304 and may be used to identify the manufactured object at a later time. For example, a database may exist that maps a part serial number to the ledger such that the serial number can be used to lookup the corresponding records in the distributed databases 304. The attestation capabilities of the architecture 300 ensure that records accessed in such a manner are correct, enabling purchasers of the object 320 to validate the origin and manufacturing history of the object 320.

Figure 4:
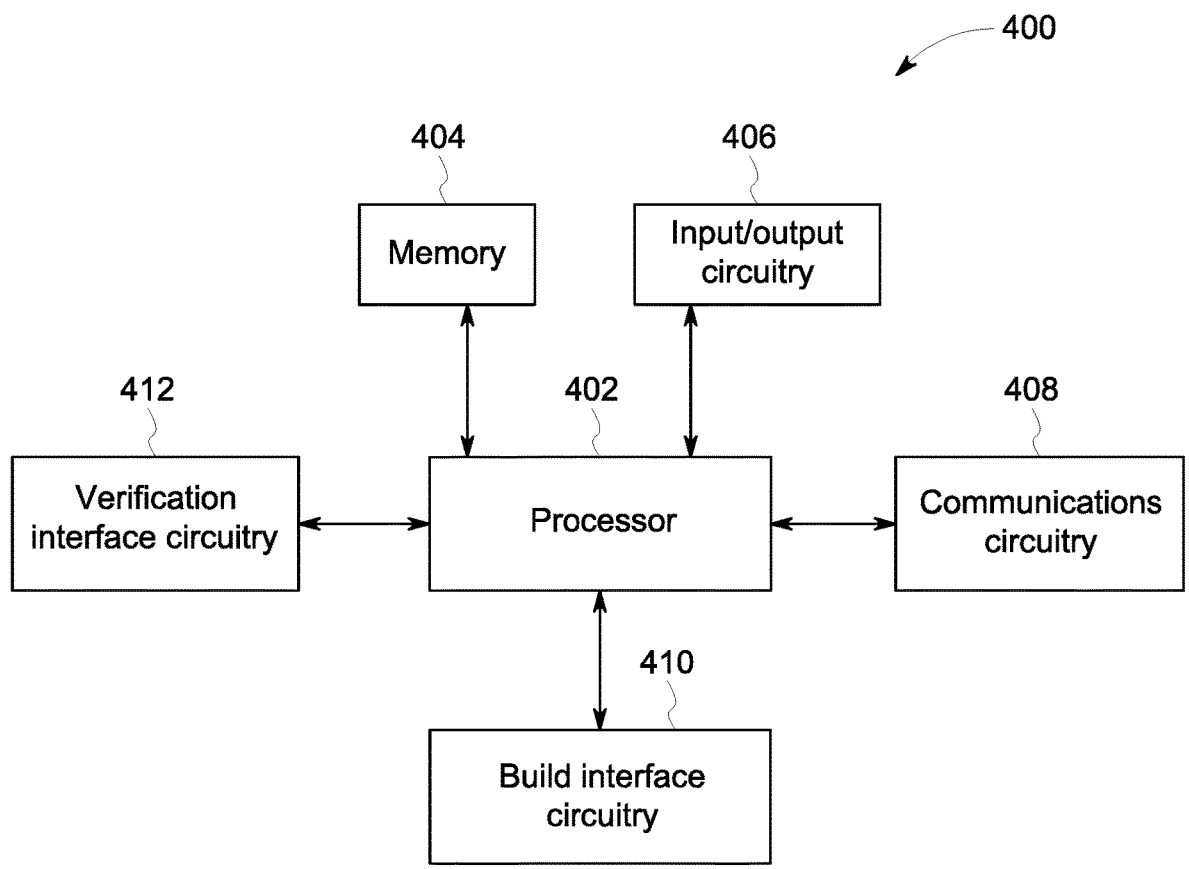
FIG. 4 depicts an example of hardware components of a computer system implementing a distributed ledger-based additive manufacturing history in accordance with some embodiments.

Examples of Computing Hardware for Implementing a Distributed Ledger History of an Additive Manufacturing Process The various components of the systems described in FIGS. 1-3 may be implemented by one or more computing nodes having specially programmed hardware and software. FIG. 4 illustrates an example of such hardware for implementing a distributed ledger for an additive manufacturing process as described above with respect to FIGS. 1-2. While the instant example 4400 is described with respect to a computing node, it should be readily appreciated that embodiments may be implemented across multiple computing nodes having various distributions of tasks and functions.

The computing device 4400 may be any computing device operable for implementing aspects of the system described above with respect to FIGS. 1-2. In this regard, the computing device may be, for example, a server, a personal computer, an additive manufacturing device controller, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device. It should also be appreciated that, in some contexts, the computing device may comprise multiple such devices in a linked or networked architecture. For example, a graphical user interface may be provided by a "thin client" capable of execution on a mobile device, with server functions provided by a desktop or server computer.

The computing device 400 of the illustrated example includes a processor 402. The processor 402 of the illustrated example is hardware, and may be implemented by one or more integrated circuits, logic circuits, microprocessors or controllers from any desired family or manufacturer. In the illustrated example, the processor 402 is structured in communication with a memory 404, input/output circuitry 406, communication circuitry 408, build interface circuitry 410 and verification interface circuitry 412.

Although the elements of the computing device 400 are described as discrete components, it should be appreciated that the components 402-412 may overlap in hardware and functionality. For example, elements of the build interface circuitry 410 may incorporate or overlap with elements of the processor 402, the communication circuitry 408, the memory 404, and the like. In some embodiments, the functionality of certain elements of the computing device 400 may be subsumed or covered completely by other elements of the device, such as in cases where an element of the computing device 400 is implemented via programmed hardware provided by another component of the computing device 400 (e.g., the processor 402 programmed by one or more algorithms stored in the memory 404).

The memory 404 may encompass any number of volatile and non-volatile storage devices, including but not limited to cache memory of the processor, system memory, mechanical or solid-state hard disk storage, network accessible storage (NAS) devices, redundant array of independent disk (RAID) arrays, or the like. Access to the memory 404 may be provided by one or more memory controllers implemented as hardware of the processor 402 and/or memory 404. The memory 404 may store instructions for programming the processor 402 to perform the various algorithms and functions for implementing embodiments as described herein.

The computing device 400 also includes an input/output circuitry 406. The input/output circuitry 406 may be implemented by any type of interface standard, such as an Ethernet interface, a universal serial bus (USB), and/or a PCI express interface. The input/output circuitry 406 may provide for communication with one or more input devices that permit a user to enter data and commands to the computing device 400 and one or more output devices for enabling audible and visual components of a graphical user interface. For example, the input/output circuitry 406 may provide data interfaces for displaying an interface via a monitor and receiving inputs from a keyboard, mouse, touchscreen, or the like. The input/output circuitry 406 may enable a user to enter data and commands that are received by the processor 402 to perform various functions. As further examples, the input/output circuitry 406 may enable input via an audio sensor, a microphone, a camera (still or video), a keyboard, a button, a mouse, a touchscreen, a track-pad, a trackball, isopoint, a gesture input system, and/or a voice recognition system. Examples of output devices enabled by the input/output circuitry 406 include, but are not limited to display devices (e.g., a light emitting diode (LED), an organic light emitting diode (OLED), a liquid crystal display, a cathode ray tube display (CRT), a touchscreen, a tactile output device, a printer and/or speakers).

The communication circuitry 408 includes one or more communication devices such as a transmitter, a receiver, a transceiver, a modem and/or network interface card configured to facilitate exchange of data with external machines (e.g., computing devices of any kind, including but not limited to the various layers of the data access framework 100 described above with respect to FIG. 1) via a network (e.g., an Ethernet connection, a digital subscriber line (DSL), a telephone line, coaxial cable, a cellular telephone system, etc.). In some embodiments, the communication circuitry 408 includes an interface for communicating with an additive printer, such as in scenarios where the computing device 400 is located externally to the additive printer as an interface to a distributed database.

The build interface circuitry 410 includes hardware configured to interact with and control an additive manufacturing process performed by an additive manufacturing device. The build interface circuitry 410 may include processing circuitry, such as the processor 402, programmed to ingest a build file and control hardware components of an additive manufacturing device to use that build file to manufacture an object. In this regard, the build interface circuitry 410 may also communicate with one or more device drivers for the particular manufacturing components (e.g., powder dispenser, laser, temperature sensors) during the manufacturing process.

The verification interface circuitry 412 includes hardware configured to communicate with a distributed ledger to verify manufacturing process inputs and to generate transactions to the distributed ledger during and/or after the manufacturing process. To this end, the verification interface circuitry 412 may include processing circuitry, such as the processor 402, to implement protocols and algorithms to perform these functions. The verification interface circuitry 412 may also include communications hardware, such as provided by the communications circuitry 408, for communicating with a distributed ledger to validate and generate transactions with that ledger as described above with respect to FIGS. 1 and 2.

Figure 5:
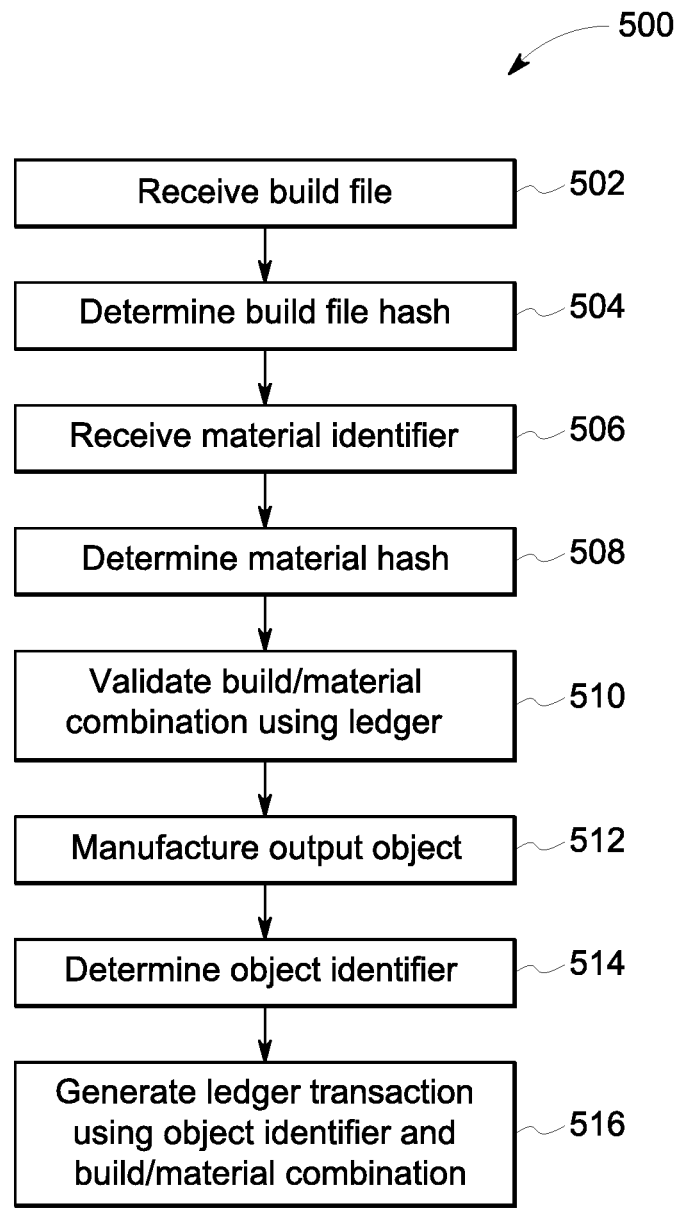
FIG. 5 depicts an example process for implementing a distributed ledger-based additive manufacturing history in accordance with some embodiments.

Examples of Processes for Implementing a Distributed Ledger-Based Additive Manufacturing History FIG. 5 illustrates an example of a process 500 for implementing a distributed ledger-based additive manufacturing history in accordance with some embodiments. The process may be implemented by an additive manufacturing device, such as the additive printer 102 described above with respect to FIG. 1. Embodiments may also be implemented utilizing computer hardware such as the controller 202 described with respect to FIG. 2, the architecture described with respect to FIG. 3, and the computer system hardware 400 described with respect to FIG. 4. The process 500 illustrates a mechanism for utilizing a distributed ledger to verify and validate an additive manufacturing process using an additive manufacturing device configured to communicate with that distributed ledger.

The process begins at action 502, where a build file is received. As noted above, the build file may include an identifier suitable for consulting a distributed ledger database to determine the legitimacy of the build file and a purported identity of the build file author. At action 504, the process 500 determines a hash from the build file.

At action 506, the process receives a material identifier. As noted above, the material identifier may be affixed or printed on packaging for the physical manufacturing media being used in the manufacturing operation. As with the build file, the material identifier may include a purported manufacturer of the material and a signed identifier suitable for interacting with the distributed ledger to verify the authenticity of the material. At action 508, a hash of the material identifier is determined. At action 510, the build file hash and the material hash are combined and validated using a ledger. Validating the combination may include initiating a query to the ledger to determine if a contract exists in a distributed database for that combination.

At action 512, a manufacturing operation is initiated to create an output object in response to validating the build/material combination. The manufacturing operation may include, for example, programming a digital manufacturing device (e.g., an additive printer) using the build file and using a lot of manufacturing material associated with the material identifier to create the output object.

At action 514, an identifier is determined for the object. Determining an identifier for the object may include, for example, assigning a serial number to the object. At action 516, the process 500 initiates a transaction to the ledger referencing the build/material combination and the object identifier. For example, the build/material contract may exist in the distributed database as an earlier transaction, and the generated ledger transaction may include a reference to that earlier transaction and the object serial number.

Embodiments may further utilize the transaction generated at action 516 to enable other aspects of the additive manufacturing process. For example, a contract between a build file author and material manufacturer may include a quantity term. Once a number of transactions referencing that contract have been published as a result of manufacturing processes, then the ledger may automatically mark the contract as completed and prevent further authentication of build operations using that contract.

Various improved functionalities and use cases may result from the use of these systems. For example, in the event of a defective part, the distributed ledger may be consulted to identify the original additive manufacturing device, the manufacturing media, and the build file used to create that defective part. These values may then be cross-referenced to do lookups of other parts with the same characteristics to attempt to identify commonalities that may be causing the defect (e.g., a misconfigured additive manufacturing device, an error in a build file, or a adulterated lot of manufacturing media).

Although specific hardware and data configurations have been described herein, note that any number of other configurations may be provided in accordance with embodiments of the present invention (e.g., some of the information associated with the databases described herein may be combined or stored in external systems). For example, although some embodiments described herein relate to assets employed in an industrial context, any of the embodiments described herein could be applied to other types of systems and assets.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. An additive manufacturing device configured to implement a distributed ledger system, the additive manufacturing device comprising:
manufacturing hardware configured to generate an object via an additive manufacturing process; and
a controller configured to:
receive a build file comprising instructions for controlling the manufacturing hardware to generate the object;
receive a material identifier indicating a particular lot of manufacturing media, wherein the material identifier comprises an identifier electronically signed by a manufacturer of the particular lot of manufacturing media;
validate the build file and the material identifier via a distributed ledger to verify at least one of an author of the build file or an origin of the particular lot of manufacturing media;
control the manufacturing hardware using the build file to generate the object using the particular lot of manufacturing media; and
in response to completion of the generation of the object, generate an object manufactured transaction to the distributed ledger indicating a result of the validation of the origin of the at least one of the build file or the material identifier,
wherein validating the origin of the particular lot of manufacturing media comprises accessing the distributed ledger to verify a material manufacturing transaction between the manufacturer of the particular lot of manufacturing media and the distributed ledger at completion of manufacturing of the particular lot of manufacturing media.

2. The additive manufacturing device of claim 1, wherein the distributed ledger is a blockchain ledger.

3. The additive manufacturing device of claim 1, wherein the build file comprises an identifier electronically signed by an author of the build file, and wherein validating the build file comprises accessing the distributed ledger to verify an authoring transaction between the author of the build file and the distributed ledger during creation of the build file.

4. The additive manufacturing device of claim 3, wherein verifying the authoring transaction between the author of the build file and the distributed ledger comprises determining that the transaction is digitally signed by the author.

5. The additive manufacturing device of claim 1, wherein the object manufactured transaction is electronically signed by a private key associated with the additive manufacturing device.

6. The additive manufacturing device of claim 1, wherein validating the build file and the material identifier via the distributed ledger comprises determining whether data indicating a contract between the author of the build file and the origin of the particular lot of manufacturing media exists within the distributed ledger.

7. An additive manufacturing device configured to implement a distributed ledger system, the additive manufacturing device comprising:
manufacturing hardware configured to generate an object via an additive manufacturing process; and
a controller configured to:
receive a build file comprising instructions for controlling the manufacturing hardware to generate the object;
receive a material identifier indicating a particular lot of manufacturing media;
validate the build file and the material identifier via a distributed ledger to verify at least one of an author of the build file or an origin of the particular lot of manufacturing media;

control the manufacturing hardware using the build file to generate the object using the particular lot of manufacturing media;

in response to completion of the generation of the object, generate an object manufactured transaction to the distributed ledger indicating a result of the validation of the origin of the at least one of the build file or the material identifier; and certify the object in response to verifying both the author of the build file and the origin of the particular lot of manufacturing media, and wherein the object manufactured transaction indicates that the object is certified.

8. A method for implementing a distributed ledger system in a digital manufacturing process, the method comprising:

receiving a build file comprising instructions for controlling the manufacturing hardware to generate the object;

receiving a material identifier indicating a particular lot of manufacturing media;

validating the build file and the material identifier via a distributed ledger to verify at least one of an author of the build file or an origin of the particular lot of manufacturing media;

causing manufacturing hardware to generate the object using the build file and the particular lot of manufacturing media; and in response to completion of the generation of the object, generating an object manufactured transaction to the distributed ledger indicating a result of the validation of the origin of the at least one of the build file or the material identifier, wherein the material identifier comprises an identifier electronically signed by a manufacturer of the particular lot of manufacturing media, and wherein validating the origin of the particular lot of manufacturing media comprises accessing the distributed ledger to verify a material manufacturing transaction between the manufacturer of the particular lot of manufacturing media and the distributed ledger at completion of manufacturing of the particular lot of manufacturing media.

9. The method of claim 8, wherein the distributed ledger is a blockchain ledger.

10. The method of claim 8, wherein the build file comprises an identifier electronically signed by an author of the build file, and wherein validating the build file comprises accessing the distributed ledger to verify an authoring transaction between the author of the build file and the distributed ledger during creation of the build file.

11. The method of claim 10, wherein verifying the authoring transaction between the author of the build file and the distributed ledger comprises determining that the transaction is digitally signed by the author.

12. The method of claim 8, wherein the object manufactured transaction is electronically signed by a private key associated with the additive manufacturing device.

13. The method of claim 8, further comprising certifying the object in response to verifying both the author of the build file and the origin of the particular lot of manufacturing media, and wherein the object manufactured transaction indicates that the object is certified.

14. The method of claim 8, wherein validating the build file and the material identifier via the distributed ledger comprises determining whether data indicating a contract between the author of the build file and the origin of the particular lot of manufacturing media exists within the distributed ledger.

15. A non-transitory computer readable storage medium comprising instructions that, when executed by a processor, cause the processor to:

receive a build file comprising instructions for controlling the manufacturing hardware to generate the object;

receive a material identifier indicating a particular lot of manufacturing media;

validate the build file and the material identifier via a distributed ledger to verify at least one of an author of the build file or an origin of the particular lot of manufacturing media;

cause manufacturing hardware to generate the object using the build file and the particular lot of manufacturing media;

in response to completion of the generation of the object, generate an object manufactured transaction to the distributed ledger indicating a result of the validation of the origin of the at least one of the build file or the material identifier, wherein the material identifier comprises an identifier electronically signed by a manufacturer of the particular lot of manufacturing media, and wherein validating comprises accessing the distributed ledger to verify a material manufacturing transaction between the manufacturer of the particular lot of manufacturing media and the distributed ledger at completion of manufacturing of the particular lot of manufacturing media.

16. The computer readable storage medium of claim 15, wherein the distributed ledger is a blockchain ledger.

17. The computer readable storage medium of claim 15, wherein the build file comprises an identifier electronically signed by an author of the build file, and wherein validating the build file comprises accessing the distributed ledger to verify an authoring transaction between the author of the build file and the distributed ledger during creation of the build file.

18. The computer readable storage medium of claim 17, wherein verifying the authoring transaction between the author of the build file and the distributed ledger comprises determining that the transaction is digitally signed by the author.

\* \* \* \* \*